July 22, 1947.　　　　G. W. PENNEY　　　　2,424,329
ARC PREVENTION FOR CONTROL SYSTEMS
Filed July 29, 1943

WITNESSES:

INVENTOR
Gaylord W. Penney.
ATTORNEY

Patented July 22, 1947

2,424,329

UNITED STATES PATENT OFFICE 2,424,329

ARC PREVENTION FOR CONTROL SYSTEMS

Gaylord W. Penney, Wilkinsburg, Pa., assignor to Westinghouse Electric Corporation, East Pittsburgh, Pa., a corporation of Pennsylvania Application July 29, 1943, Serial No. 496,605

11 Claims. (Cl. 175—294)

1

My invention relates, generally, to control systems, and it has reference, in particular, to switching control systems for accurately controlling the energization of load circuits from alternating current sources.

Generally stated, it is an object of my invention to provide a switching system which is simple and inexpensive to manufacture and is accurate and reliable in operation.

More specifically, it is an object of my invention to provide for using a rectifier means in connection with contact devices to permit interruption of a load circuit during half cycles when substantially no current is carried by the contact devices, so as to require only a minimum movement of the contact devices to interrupt the circuit.

It is also an object of my invention to provide for using a plurality of relatively high speed contact devices having a contact separation less than that normally required for interrupting the load current for controlling the energization of a load circuit from an alternating current source, and using unidirectional current devices for blocking the flow of current through the contact devices in alternate half cycles so that interruption of the circuit may be effected when the flow of load current is blocked by the unidirectional current devices.

Another object of my invention is to provide for limiting the flow of current through a contact device so that the contacts thereof need be separated only a minimum amount to successfully interrupt a load circuit.

Yet another object of my invention is to provide for blocking the flow of alternating current through each of a pair of contact devices which are connected in parallel circuit relation on alternate half cycles so that operation of the contact devices may be effected during half cycles in which the flow of current therethrough is blocked.

Still another object of my invention is to provide for accurately controlling the energization of a circuit from an alternating-current source by using relatively high speed contact devices having a contact separation much less than that required to interrupt the normal flow of current in the circuit and using rectifier means in series with each of the contact devices so that they may be operated during half cycles when carrying only the reverse current of the rectifier means.

Other objects will, in part, be obvious and will, in part, be explained hereinafter.

In accordance with one embodiment of my invention, a pair of high speed contact devices are

2 connected in parallel circuit relation for controlling the energization of a load circuit from an alternating-current source. High speed operation of the contact devices is largely secured by providing them with only a minimum amount of contact separation which may be much less than that normally required to interrupt the load current. Interruption of the load current is successfully effected by connecting rectifier means in series with the contact devices in opposite senses, so that the flow of load current therethrough is prevented on alternate half cycles. Operation of the contact devices is effected so that they open and close only in the half cycles during which their respective rectifier means block the flow of load current, whereby only the reverse current of the rectifier means need be interrupted.

For a more complete understanding of the nature and scope of my invention, reference may be made to the following detailed description, which may be studied in connection with the accompanying drawing, in which.

Figure 1:
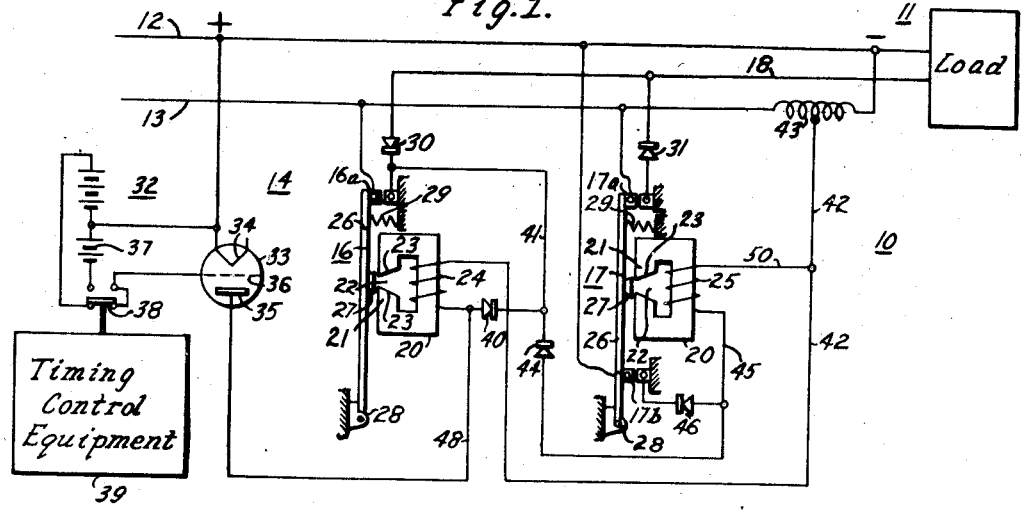
Figure 1 is a diagrammatic view of a switching system embodying the invention in one of its forms.

Referring to Fig. 1, the reference numeral 10 may denote, generally, a control system wherein a load device 11 may be connected to a source of alternating current through conductors 12 and 13 by switch means denoted, generally, by the numeral 14.

The switch means may, for example, comprise a pair of contact devices 16 and 17 having contact members 16a and 17a, respectively, connected in parallel circuit relation between the conductor 13 and an auxiliary conductor 18 for connecting the load device 11 to the alternating-current source. The contact devices 16 and 17 may be of substantially similar construction comprising, for example, a generally C-shaped magnetic core member 20 having pole members 21 separated by a relatively small air gap 22. The pole members may be provided with beveled faces 23 so as to provide a high concentration of magnetic flux at the outer edge of the air gap which may be less than the thickness of the core member. For example, with a generally rectangular core having overall dimensions about 2¼ inches square and having a cross section about ⅝ inch wide by ½ inch thick, an air gap of about 3/16 inch may be used with the pole faces at approximately 45°. Operating windings 24 and 25 may be positioned on the core members 20 for effecting operations of the contact devices.

In order to effect high speed operation of the contact members 16a and 17a of the contact devices 16 and 17, movement of these contact members may be limited to a minimum which is much less than the distance normally required for interrupting a load circuit having a load current flowing therein of the value which the contact members are arranged to carry.

High speed operation of the contact members may be secured by mounting them on support members 26 having magnetic armatures 27 of a relatively small size arranged for bridging the air gaps 22 and positioned in relatively close relation to the pole members 21 of the core members 20. To keep the masses of the armatures to a minimum, it is preferable that the cross section of the armature be small compared to the cross section of the core, and that the armature overlap the pole tips to provide air gaps having areas each at least equal to the cross sectional area of the armature so that the armature may be saturated before the pole tips are. By utilizing a relatively short travel of the contact members, for example, .025 inch, only a relatively small movement of the armatures 27 is necessary for this contact travel. Therefore, the armatures 27 may be relatively small and light, having a length about three times the length of the air gap, a thickness about equal to the length of the air gap, and a width slightly less than that of the core, and may be positioned relatively close to the magnetic core members 20, on the order of .02 to .03 inch, so as to leave an air gap intermediate it and the core when the contact members are in the closed position, and a relatively high concentration of magnetic flux therethrough may be secured for effecting rapid movement of the support members 26.

The support members may comprise cantilever spring members secured at the end opposite the contact members, or may, as shown, be supported by means of pivots 28 and provided with compression spring members 29 for maintaining the contact members in a normally open position. Operation of a contact device embodying these features may be accomplished in less than one-half cycle. The air gap in the closed position facilitates high speed operation by preventing retardation of armature movement by the residual flux.

In order to permit the contact members 16a and 17a to interrupt the energization of the load device 11 successfully, unidirectional current means, such as the dry type rectifier devices 30 and 31, may be connected in series circuit relation with the contact members 16a and 17a in opposed relation. Operation of the contact devices 16 and 17 may be secured during the half cycles in which their respective rectifier devices prevent the flow of load current through their contact members. For example, control means denoted, generally, by the numeral 32 may be provided for effecting the energization of the operating winding 24 only during half cycles in which the conductor 12 is negative, so that the rectifier device 30 may be effective to block the flow of load current through the contact member 16a during the interval in which they open or close.

The control means 32 may comprise valve means 33 of the arc discharge type having a cathode 34 connected to the conductor 12 and an anode 35 connected to the operating winding 24. The valve means may be provided with a control grid 36 for controlling the conductivity thereof. Means such as the battery 37 may be used in connection with a control switch 38 and suitable control means 39 of a type well known in the art, for applying control voltages to the control grid 36 for suitable timed intervals during which it is desired to maintain the load energized. The control means may comprise, for example, a timing circuit such as shown and described in the Dawson Patent No. 2,008,413, Serial No. 707,931, which issued on July 16, 1935, and is assigned to the assignee of the present invention.

In order to provide for maintaining the contact members 16a in the closed position during a half cycle in which the contact members are conducting the load current, a unidirectional holding circuit may be provided for the operating winding 24 through the contact members 16a by means of a rectifier device 40, a conductor 41, a conductor 42 and a control transformer 43.

Operation of the contact device 17 may be secured during a half cycle in which the contact device 16 is carrying the load current by providing a unidirectional energizing circuit for the operating winding 25 thereof through the contact members 16a of the contact device 16 by means of a rectifier device 44 and a conductor 45. The contact members 17a may be maintained in the closed position for the succeeding half cycle during which the contact members are carrying the load current by means of a unidirectional holding circuit including a rectifier device 46 and auxiliary contact members 17b.

Figure 2:
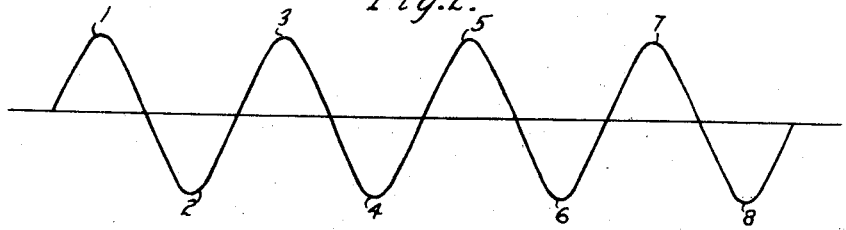
Fig. 2 shows an alternating-current voltage wave with the half cycles numbered to facilitate following typical operations for the system of Fig. 1.

Referring to Figs. 1 and 2 the operation of the control system of Fig. 1 may be described as follows. Suppose, for example, the odd numbered half cycles of Fig. 2 represent those in which the conductor 12 is negative. If the grid 36 of the valve means 33 is provided with a suitable control voltage for making the valve means conductive, nothing can happen until the beginning of an odd half cycle such as the half cycle #3 when a positive voltage is applied to the anode 35 of the valve means 33 from the conductor 13. The valve means 33 conducts and energizes the operating winding 24 of the contact device 16 through a circuit extending from the conductor 13, the left-hand portion of the control transformer 43, through conductor 42, operating winding 24, conductor 48, and the valve means 33 to conductor 12. The contact device 16 operates, closing the contact members 16a, but the flow of load current is prevented by the rectifier means 30 until the next half cycle.

In half cycle #4 the load device 11 is energized through the circuit extending from the conductor 12 through the load device, conductor 18, rectifier device 30, contact members 16a, to conductor 13. At the same time the operating winding 25 of the contact device 17 is energized through the circuit extending from the conductor 12, the right-hand side of the control transformer 43, conductor 42, conductor 50, operating winding 25, conductor 45, rectifier device 44, conductor 41, and contact members 16a to conductor 13. The contact device 17 operates, closing contact member 17a but the flow of current therethrough is blocked during this half cycle by the rectifier device 31. Throughout half cycle #4 the contact device 16 is maintained in the closed position by means of the holding circuit extending from conductor 12 through the right-hand side of the control transformer 43, conductor 42, operating winding 24, rectifier device 40, conductor 41, and contact member 16a to conductor 13.

If the control grid 36 remains suitably energized, the contact device 16 is maintained in the closed position during half cycle #5 by means of the energizing circuit completed between the conductors 13 and 12 by means of the valve means 33. The load device 11 remains connected to the source through the circuit extending from the conductor 13, contact member 17a, rectifier device 31, conductor 18, load device 11 to conductor 12. Energization of the load device may thus be maintained for any suitable length of time by maintaining the valve means 33 conductive through operation of the control switch 38 during the half cycle in which the conductor 12 is negative.

Suppose, for example, the control voltage is removed from the control grid 36 during half cycle #6. During this half cycle the contact device 16 carries the load current and is maintained in the closed position by the energizing circuit extending from the control transformer 43, through the operating winding 24, rectifier device 40, conductor 41 and the contact members 16a, so that operation of the contact device 16 is unaffected by the valve means being made nonconductive in an even numbered half cycle. Since the contact device 17 is maintained in the closed position through the holding circuit extending through the contact member 16a, it is likewise unaffected during this half cycle.

At the beginning of half cycle #7, the holding circuit for the contact device 16 through the contact member 16a is blocked by the rectifier device 40 which is nonconductive when the conductor 12 is negative. The contact device 17 remains closed by virtue of the holding circuit through the rectifier device 46 and the auxiliary contact members 17b and carries the load current. Since the valve means 33 is nonconductive, the operating winding 24 is deenergized and the contact members 16a open. During half cycle #8, the rectifier device 31 in series with the contact members 17a of the contact device 17 blocks the flow of load current. Since the holding circuit through the auxiliary contact member 17b is blocked by the rectifier device 46 during this half cycle when the conductor 12 is positive, and the holding circuit for the operating winding 25 through the contact members 16a is already interrupted, the operating winding 25 is deenergized and the contact device 17 opens, thus completely disconnecting the load device 11 from the source.

Since the contact devices operate only during the particularly half cycle in which the flow of load current is blocked by their respective rectifier devices, the load device may be successfully disconnected from the source by a minimum of separation of the contact members 16a and 17a. By using a contact separation on the order of .025 inch, for example, and providing a magnetic core structure which requires an armature having only a minimum of mass, the mechanical inertia of the contact devices may be reduced to a minimum and the closing force maintained at a maximum. Relatively high speed operation of the contact devices may thus be secured so that operation thereof may be effected in less than one-half cycle, so as to insure interruption of the load circuit during half cycles in which the flow of current is blocked by the respective rectifier devices.

A contact device such as shown and described hereinbefore has been satisfactorily operated for more than 500,000 operations handling a current of 50 amperes at 110 volts, without any signs of failing, thus proving that effective interruption of the circuit may be secured in accordance with the embodiments of my invention. Currents of 100 amperes have also been interrupted without any trouble. Any even number of half cycles of conduction may thus be easily secured by means of a switching system embodying the features of my invention.

Figure 3:
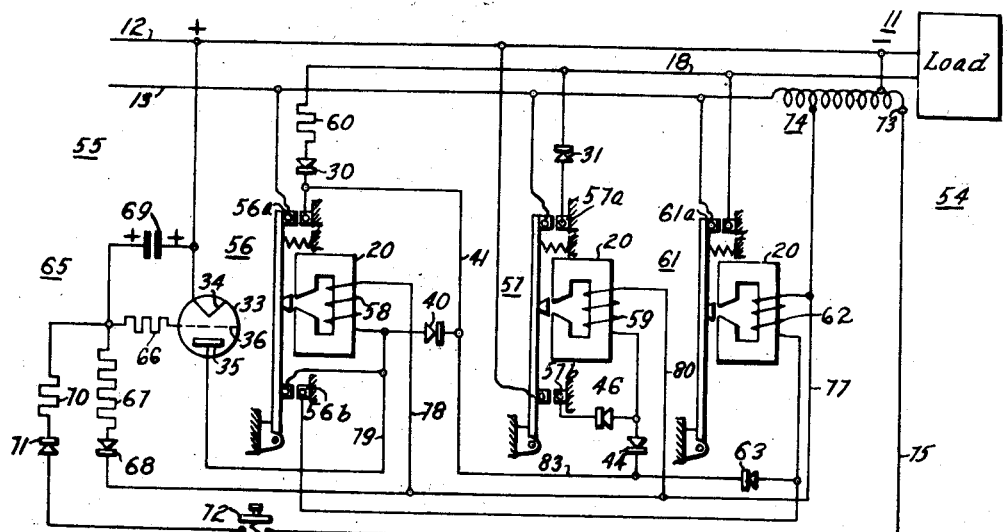
Fig. 3 is a diagrammatic view of a switching system embodying the invention in another of its forms.

Referring to Fig. 3, the reference numeral 54 may denote, generally, a control system wherein a load device 11 may be connected to a suitable source of alternating current through conductors 12 and 13 by means of switch means denoted, generally, by the numeral 55. The switching means may, for example, comprise a pair of contact devices 56 and 57 having operating windings 58 and 59. These contact devices may be of generally the same construction as the contact devices 16 and 17 of Fig. 1 and connected in a similar manner between the conductors 13 and 18 with rectifier devices 30 and 31 connected in opposed relation in series circuit relation with each of the rectifiers.

In order to provide for switching a reactive load which may produce relatively high transient currents if connected to the source at the zero point of voltage wave, an impedance device 60 may be connected in series circuit relation with the contact members 56a of the contact device 56 for limiting the flow of current therethrough. An auxiliary contact device 61 having an operating winding 62 may be provided, of substantially similar construction to the other contact devices, and connected in parallel circuit relation therewith between the conductors 13 and 18. No rectifier device need be used in connection with the contact device 61, which is disposed to carry the load current on both half cycles of alternating current wave subsequently to the initial half cycle during which the load is connected to the source, and until the final half cycle during which the load is disconnected from the source. Energization of the operating winding 62 of the contact device 61 may be initially effected through a unidirectional circuit including a rectifier device 63, and extending through the contact members 56a of the contact device 56. Auxiliary contact members 56b may be provided for effecting energization of the operating winding 62 through the valve means 33 after the contact device 56 operates. Energization of the operating winding 59 of the contact device 57 may be effected in a similar manner as is described in connection with the contact device 17 in Fig. 1.

In order to effect operation of the contact device 56 only on even half cycles during which the conductor 12 is positive, control means 65 may be provided comprising, for example, valve means 33 of the arc discharge type having an anode 35 and a cathode 34 connected in series circuit relation with the operating winding 58 of the contact device 56 and the conductors 12 and 13. In order to maintain the valve means 33 normally nonconductive, suitable control means may be provided such as, for example, the control resistor 67 and rectifier device 68, which may be connected so as to provide a charging circuit through a control capacitor 69 which puts a negative bias voltage on the control grid 36 of the valve means.

For the purpose of making the valve means conductive only at the beginning of half cycles when the conductor 12 is negative, an auxiliary control circuit may be provided for removing the negative bias during half cycles when the conductor 12 is positive. The control circuit may comprise a control resistor 70 and a rectifier device 71 which may be connected to the control grid 36 through a suitable control switch 72, which may be actuated in any suitable manner, such as by means of a timing circuit similar to that of the Dawson patent hereinbefore referred to, from the high voltage terminal of a step-up autotransformer 74 which may be connected between the conductors 12 and 13. A control voltage may thus be applied to the capacitor 69 when the conductor 12 is positive to sufficiently reduce the negative bias thereof to permit the valve means to conduct on the next half cycle.

Operation of the control system of Fig. 3 may be described substantially as follows. Normally the control circuit 69, 67, and 68 maintains the valve means 33 nonconductive. If the switch 72 is closed during half cycle #1 of Fig. 2, in which the conductor 12 is negative, no action results, since the rectifier devices 68 and 71 are nonconductive, and the grid bias circuit including the capacitor 69, resistors 67 and rectifier device 68 maintains a negative bias voltage on the control grid because of its time constant, rendering the valve means 33 nonconductive.

At the beginning of half cycle #2 during which the conductor 12 is positive, a control voltage is applied to the capacitor 69 through the circuit extending from the right-hand high voltage terminal 73 of the autotransformer 74 through conductor 75, the control switch 72, rectifier device 71, control resistor 70 and capacitor 69 which discharges the capacitor and reduces the negative bias on the control grid sufficiently to render the valve means conductive when the anode becomes positive.

During half cycle #3, during which the conductor 12 is negative, the valve means 33 conducts and the operating winging 58 of the contact device 56 is energized through the circuit extending from the center tap of the autotransformer 74 through conductor 77, conductor 78, operating winding 58, conductor 79, and valve means 33 to the other side of the line. The contact device 56 closes, but the flow of load current therethrough is prevented by the rectifier device 30.

On half cycle #4, during which the conductor 12 is positive, contact members 56a carry the load current, which is limited to a reasonable value by the impedance device 60, so as to prevent undesirable transients should the load device 11 be reactive. During this half cycle, the contact device 56 is maintained in the operating position by the holding circuit extending from the center tap of the autotransformer 74 through conductor 77, conductor 78, the operating winding 58, rectifier device 49, conductor 41, and contact members 56a to conductor 13. At the same time, contact devices 57 and 61 are operated to the closed position by the energization of the operating windings 59 and 62 thereof through the circuits extending from the center tap of the autotransformer 74, respectively, through conductors 77, 80, operating winding 59, rectifier device 64, conductor 83, and conductor 41, through contact members 56a to conductor 13, and through operating winding 62, rectifier device 63, conductor 83, conductor 41 and contact members 56a to conductor 13.

On half cycle #5, the contact device 61 carries the principal load current, since the impedance of the circuit through its contact members 61a is substantially less than that through the contact members 56a of the contact device 56. The rectifier device 31 blocks the flow of current through the contact member 57a of the contact device 57. If the switch 72 is maintained in the closed position, the contact device 61 continues to carry the principal load current on both half cycles.

If the control switch 72 is opened during half cycle #6, while the conductor 13 is negative, the control voltage applied to the control grid 36 immediately becomes negative by reason of the bias circuit through the capacitor 69, resistor 67 and rectifier device 68 so that the valve means 33 ceases to conduct at the end of this half cycle. The contact device 61 continues to carry the principal load current during the half cycle.

On half cycle #7, when the conductor 12 becomes negative, the valve means 33 remains nonconductive and the rectifier device 30 blocks the flow of load current through contact members 56a. Rectifier device 40 blocks the energizing circuit for the operating winding 58 of the contact device 56, so that the contact device 56 opens. This interrupts the energizing circuit for the operating winding 62 of the contact device 61 so that it opens likewise. The contact device 57 remains in the closed position by reason of the holding circuit through the operating winding 59, rectifier device 45 and auxiliary contact members 57b, and continues to carry the load current during this half cycle.

On half cycle #8, when the conductor 12 becomes positive the rectifier device 31 blocks the flow of current to the load device 11. The operating winding 59 of the contact device 57 becomes deenergized, and the contact device returns to the deenergized position so that the load device is effectively disconnected from the source.

The length of time of the conducting period may be controlled by controlling the time during which the control switch 72 is closed, by means of suitable timing circuits such as are well known in the art and such as have been hereinbefore referred to, or by adjusting the values of the control resistors 70, 67, and 66 and the capacitor 69 so as to vary the time constants of the control circuits applying bias voltages to the control grid 36.

Control systems embodying the features of my invention are both simple and inexpensive to manufacture and reliable and efficient in operation. Since each of the rectifier devices is in service during only one-half cycle in each operating period, relatively heavy momentary currents may be carried thereby without any danger of overheating. By using rectifier devices in the manner hereinbefore described to block the flow of current through contact devices in alternating half cycles, effective interruption of a relatively heavy load circuit may be secured with a minimum of contact separation, since only the reverse current of the rectifier device need be interrupted. In this manner the inertia of the contact devices may be reduced to a minimum so that high speed operation (one-half cycle or less) may be secured for efficiently interrupting the circuit during the periods of low current flow. Accurately timed impulses of a few cycles duration may thus be obtained for such applications as timing high speed X-ray photographs, and some welding applications.

Since certain changes may be made in the above description and different embodiments of the invention may be made without departing from the spirit and scope thereof, it is intended that all the subject matter contained in the above description or shown in the accompanying drawing shall be considered as illustrative and not in a limiting sense.

I claim as my invention:

1. A control system for a load circuit disposed to be energized from an alternating current source comprising, a pair of contact means connected in parallel circuit relation and in series circuit relation with the load circuit and the source, rectifier means connected in series circuit relation with each of the contact means and in opposite senses, control means effecting closure of one of the contact means during a half cycle when its rectifier means blocks the flow of load current, circuit means maintaining said one contact means closed during the next half cycle, additional circuit means for effecting closure of the other contact means while said one contact means carried the load current, and circuit means dependent on the closure of said one contact means effective to maintain said other contact means in the closed position.

2. A control system for connecting a load circuit to an alternating current source comprising, a pair of contact devices having relatively movable contact members with a separation less than necessary to interrupt the load current connected in parallel circuit relation with each other and in series circuit relation with the load circuit and source and having operating windings energizable to operate the contact members to connect the load circuit to the source, unidirectional current means connected in series circuit relation with each of the contact devices and in opposite senses to prevent the flow of current therethrough on alternate half cycles, control means energizing the operating winding of one of the contact devices to close its contact members during a half cycle when its associated unidirectional current means prevents the flow of current, circuit means energizing the operating winding of the other contact device while current flows through said one contact device, and additional circuit means maintaining the energization of the operating windings during the half cycles their associated contacts carry the load current.

3. A control system for connecting a load circuit to an alternating current source comprising, a pair of switch means connected in parallel circuit relation with each other and in series circuit relation with the load circuit and source operable to connect the load circuit to the source, rectifier means connected in series circuit relation with each of the switch means and in opposed relation so as to block the flow of current through the switch means on opposite half cycles, grid controlled valve means effecting operation of one of the switch means to connect the load circuit to the source in a half cycle when its associated rectifier means blocks the flow of current, circuit means dependent on the connection of the load circuit to the source by said one switch means effective to maintain said one switch means in the operated position and effect operation of said other switch means to connect the load circuit to the source during the next half cycle, and additional circuit means dependent on the operation of said other switch means effective to maintain said other switch means in the operated position during the half cycles when its associated rectifier means conducts the load current.

4. A timing system comprising, a pair of contact devices connected in parallel circuit relation for connecting a load circuit to an alternating current source, unidirectional current means connected in series circuit relation with each of the contact devices in opposed relation for blocking the flow of current therethrough on half cycles of opposite polarity, timing means including a grid controlled valve connected to effect closure of one of the contact means for a predetermined number of alternate half cycles during which its associated unidirectional current means blocks the flow of load current, circuit means dependent on the closure of said one contact means for maintaining closure of said one contact means and effecting closure of said other contact means during the next half cycle and succeeding alternate half cycles, and additional circuit means maintaining closure of said other contact means during the half cycles in which said other contact means carries the load current.

5. The combination with a load circuit and a source of alternating current of, switch means operable to connect the load circuit to the source and provided with an operating winding, additional switch means having an operating winding, said additional switch means being connected in parallel circuit relation with the first-mentioned switch means and operable to connect the load circuit to the source, rectifier means connected in series with the first-mentioned switch means to block the flow of current in one direction, additional rectifier means connected in series circuit relation with the additional switch means to block the flow of current in the other direction, control means including a grid controlled valve operable to energize the operating winding and effect operation of the first-mentioned switch means during a predetermined number of half cycles when its rectifier means blocks the flow of current for connecting the load circuit to the source during the subsequent half cycle, circuit means completed by the switch means and including rectifier devices providing energizing circuits for the operating windings of the first-mentioned switch means and the additional switch means when said first-mentioned switch means conducts load current, and circuit means completed by the additional switch means and including rectifier means providing an energizing circuit for the operating winding of the additional switch means while it carries the load current.

6. A switching system for effecting the energization of a load circuit from an alternating current source comprising, a pair of switch devices connected in parallel circuit relation between the load circuit and the source, rectifier means connected in series circuit relation with each of the switch devices for blocking the flow of current therethrough on opposite half cycles, impedance means connected in series circuit relation with one of the switch devices, an additional switch device connected in parallel circuit relation with the other switch devices, control means operable to effect operation of the switch device having the series impedance to connect the load circuit to the source during a half cycle when its rectifier means blocks the flow of current, circuit means dependent on the closure of said switch device to effect operation of the other switch devices on the next half cycle, and circuit means dependent on the closure of the other switch device having rectifier means in series therewith to retain said switch means in the operated position during a half cycle wherein it carries the load current.

7. A switching system for controlling the connection of a load circuit to a source of alternating current comprising, contact means operable to connect the load circuit to the source, rectifier means connected in series with the contact means to prevent the flow of current on alternate half cycles, impedance means connected in series with the contact means to limit current transients, means for operating the contact means including a normally non-conductive valve provided with a control circuit rendering it conductive only on the half cycles when the contact means is blocked by the rectifier means, additional contact means operable in response to operation of the said contact means to provide a relatively low impedance path between the load circuit and the source while the said contact means remains closed, auxiliary contact means operable in response to operation of said contact means to provide an additional path between the load circuit and the source, rectifier means connected in series with the auxiliary contact means in the opposite sense to that of said switch means, and circuit means operable to retain the auxiliary switch means in the operating position until the load current is blocked by its rectifier means.

8. A control system for controlling the energization of a circuit from an alternating current source comprising, a contact device operable to connect the circuit to the source having a contact separation less than that necessary to interrupt the load current and having a rectifier in series therewith to block the load current on alternate half cycles, impedance means connected in series with the contact device to limit current transients, control means operable to effect operation of the contact means only in a half cycle when the rectifier means blocks the flow of current, an additional contact device operable under the control of said contact means to provide a low impedance connection between the circuit and the source, and an auxiliary contact device having rectifier means connected in the opposite sense operable under the control of said switch device to disconnect the circuit from the source when its rectifier means blocks the load current.

9. Switching means for use with an alternating-current source and a load circuit comprising, a first contact device interposed between the source and the load circuit having rectifier means in series relation therewith to prevent the flow of current on half cycles of one polarity and having an operating winding, a second contact device having an operating winding, said second device having rectifier means in series relation therewith to prevent the flow of current on half cycles of the opposite polarity connected in parallel with the first contact device and rectifier means, circuit means including a unidirectional current device connecting the winding of the first device for energization on half cycles of one polarity independently of said second device, and circuit means for selectively energizing said windings and effecting operation of the contact devices to complete and interrupt the load circuit during the half cycles that current flow therethrough is blocked.

10. A control system comprising, a first switch means having rectifier means connected in series therewith to block the flow of current therethrough on half cycles of one polarity, control means effecting operation of the relay means only during half cycles when the flow of current is blocked, and a second switch means disposed in parallel circuit relation with said first switch means and operable under the control of the first switch means when the said rectifier means does not block the flow of current, and additional rectifier means connected in series relation with the second switch means to block the flow of current when the first mentioned rectifier means does not block the flow of current.

11. A switching system comprising, switch means operable to connect a circuit to a source through rectifier means and an impedance during a half cycle when the rectifier means blocks the flow of current from the source, additional switch means operable under the control of said switch means to provide a low impedance bi-directional path between the circuit and the source, and auxiliary circuit means including switch means and rectifier means connected in the opposite sense to said rectifier means operable under the control of said switch means to maintain a connection between the circuit and source for one half cycle after the said switch means opens.

GAYLORD W. PENNEY.

REFERENCES CITED

The following references are of record in the file of this patent:

UNITED STATES PATENTS

| Number | Name | Date |
|---|---|---|
| 1,708,384 | Fox | Apr. 9, 1929 |
| 1,902,958 | Jackson | Mar. 28, 1933 |
| 1,982,875 | Koppitz | Dec. 4, 1934 |
| 2,226,203 | Jacoby et al. | Dec. 24, 1940 |
| 978,999 | Gernsback | Dec. 20, 1910 |
| 1,193,660 | Barnum | Aug. 8, 1916 |
| 1,656,837 | Smith | Jan. 17, 1928 |
| 2,329,036 | Ebert | Sept. 7, 1943 |

FOREIGN PATENTS

| Number | Country | Date |
|---|---|---|
| 511,702 | Great Britain | Aug. 23, 1939 |